UNITED STATES PATENT OFFICE.

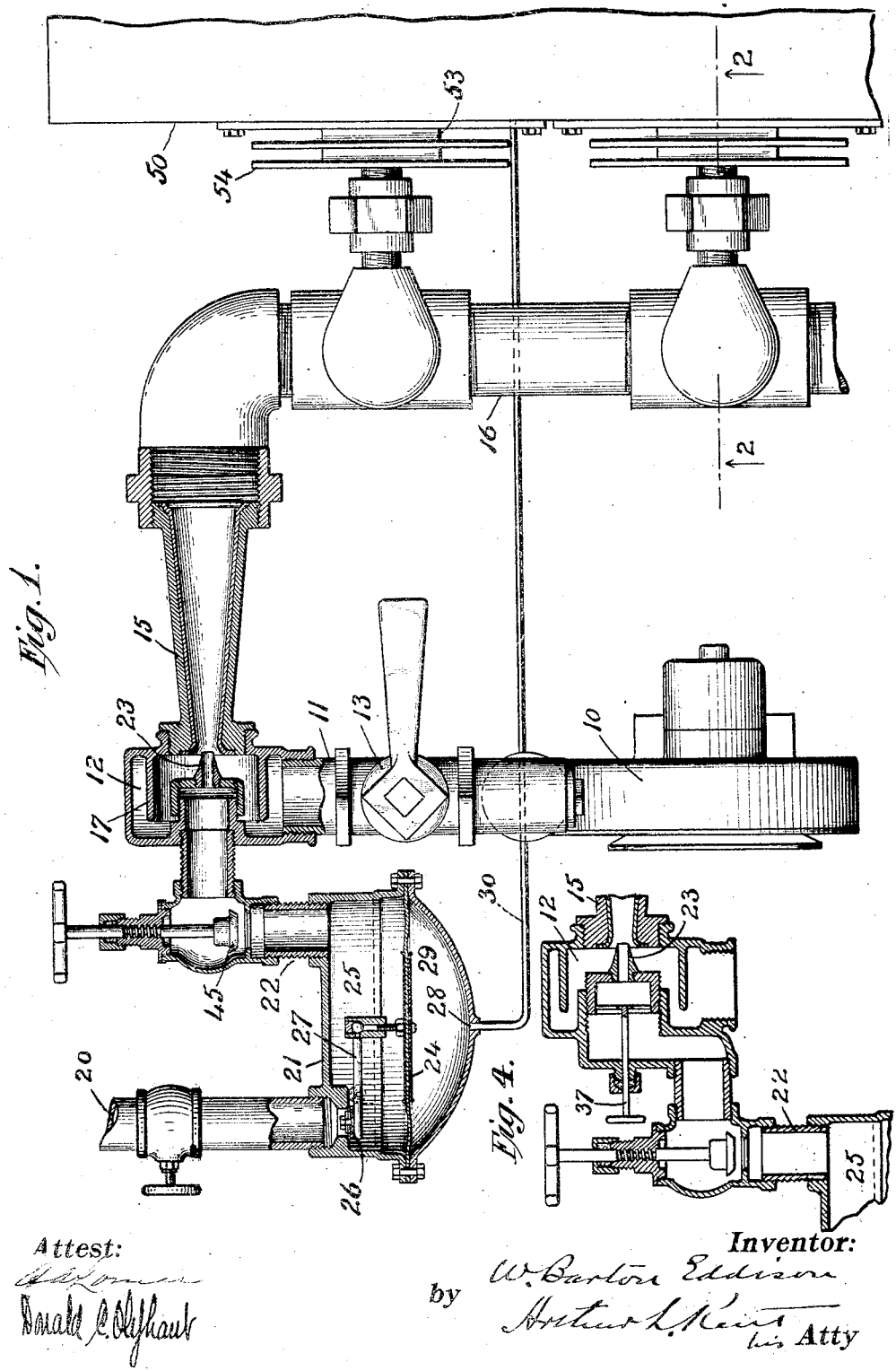

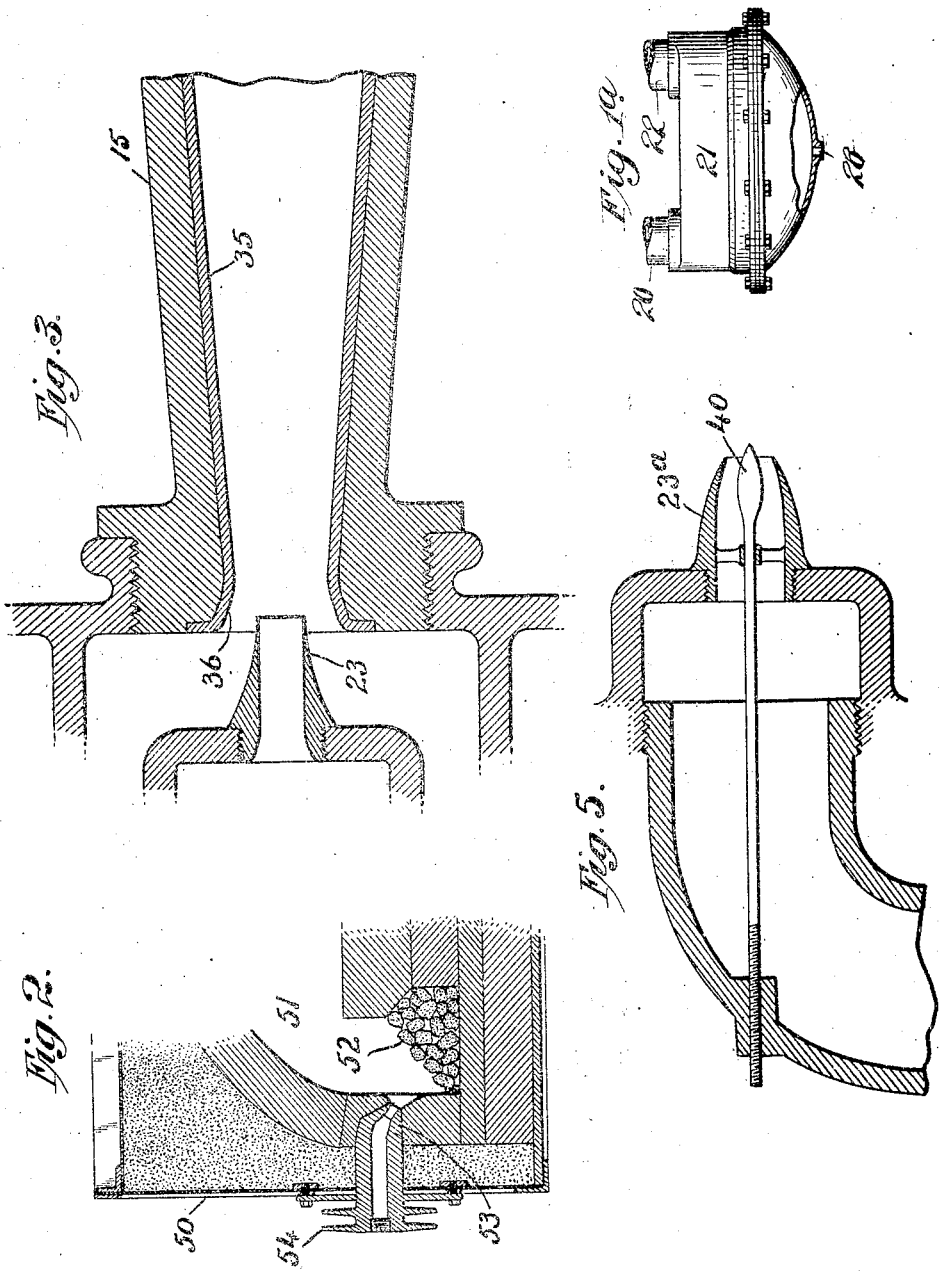

WILLIAM BARTON EDDISON, OF IRVINGTON, NEW YORK, ASSIGNOR TO THE SURFACE COMBUSTION CO., INCORPORATED, OF NEW YORK, N. Y., A CORPORATION OF NEW YORK.

METHOD OF AND APPARATUS FOR MIXING AND PROPORTIONING GASES.

1,295,085. Specification of Letters Patent. Patented Feb. 18, 1919.

Application filed November 11, 1916. Serial No. 130,887.

*To all whom it may concern:*

Be it known that I, WILLIAM BARTON EDDISON, a citizen of the United States, residing at Irvington, in the county of Westchester and State of New York, have invented certain new and useful Improvements in Methods of and Apparatus for Mixing and Proportioning Gases, fully described and represented in the following specification and the accompanying drawings, forming a part of the same.

This invention relates to a method and apparatus for mixing and proportioning gases, and more especially to a method and apparatus for supplying an explosive mixture of air or other combustion supporting gas and a fuel gas in constant proportions to surface combustion furnaces at a velocity suitable to the requirements of surface combustion.

The invention has been made with the object of providing a method and apparatus whereby a well mixed, homogeneous gaseous mixture may be conveniently supplied to the burner discharge orifices of a surface combustion furnace at a pressure above a predetermined minimum and in quantities variable at will and without changing the proportions of the constituent gases, that is, to meet the conditions of constant proportions, variable quantity, and exit pressure sufficient to prevent backflashing. A further object is to utilize efficiently the pressure energy of one of the gases entering into the mixture for securing the supply of the mixture at a pressure higher than that at which the other constituent gas is available.

The invention comprises a method wherein the pressure energy of a gas supplied under a relatively high pressure is changed in part to velocity energy with reduction of pressure, and the other gas under a relatively low pressure is supplied to the stream of the inducing gas at the place of relatively high velocity and low pressure, some of the velocity energy of the mixture thus produced then being changed back to pressure energy and the mixture being discharged under the desired pressure from the burner orifice; the flow of the inducing gas and the induced gas and the mixture all being controlled according to the flow law of orifices having constant coefficients, and the induced gas being supplied to the mixing means at a pressure approximately equal to the furnace pressure or pressure against which the mixture is discharged from the burner orifice or outlet; and the invention also comprises apparatus for producing and supplying a gaseous mixture in accordance with such method, all as hereinafter more fully described and as claimed.

In supplying an explosive gaseous mixture in accordance with my method and by my apparatus, the air may and in many cases will be the gas which is supplied under pressure and which serves as the inducing gas, this for the reason that the air is usually the gas used in the largest volume and because in many establishments there is already installed and available a central supply of pressure air and also because it is in some respects more convenient and desirable to handle air under pressure rather than the fuel gas. The fuel gas may, however, be used as the driving fluid, and may sometimes most desirably be so used, especially when a supply of high pressure gas is available, or when, as with some weak gases, the gas volume is equal to or larger than the air volume used in combustion. For convenience in further description of the invention, it will be considered that the air is to be the driving or inducing gas.

The air, being then the inducing gas, is supplied under a sufficient pressure past an adjustable restriction or controlling valve to a chamber from which it passes into a Venturi tube, that is, a tube or conduit of substantially circular cross-section and comprising an entrance cone, or portion tapering from large to small in the direction of flow, and a discharge cone beyond the entrance cone which tapers from small to large and which is joined to the entrance cone by a throat or portion of minimum cross-section, the two tapering portions being of limited angle between the sides. In passing through the entrance cone of the Venturi tube, some of the pressure energy of the air is changed into velocity energy with reduction of pressure so that the air passes through the throat of the Venturi tube with largely increased velocity and at a correspondingly reduced pressure. The fuel gas, which may be taken at any available pressure from a suitable source, as from an ordinary pipe line at the distribution line pressure, passes through a governing device which causes it to be supplied, at a pressure maintained approximately equal to that against which the mixture is discharged, that is, the furnace pressure, to be discharged from a nozzle orifice set to discharge into the air in a region of relatively high velocity and low pressure in the entrance cone of the Venturi tube adjacent the throat thereof. A flow of gas from the gas nozzle is thereby induced, and the gas entering the stream of air at this point of high velocity and low pressure becomes thoroughly mixed with the air, and as the mixture then passes on through the diverging portion, or pressure cone, of the Venturi tube velocity energy is converted back into pressure energy so that the mixture passing on from the Venturi tube through a suitable relatively large conduit will be supplied to the burner nozzle or discharge orifice or orifices under a suitable pressure, which, while less than that under which the air is supplied, will be substantially greater than that under which the fuel gas is supplied, or the ordinary line pressure and greater than the furnace pressure. A homogeneous mixture of the fuel gas and air will thus be supplied to the burner nozzle or orifice and will be discharged under a suitable pressure therefrom into a furnace at a suitable velocity for preventing backflashing through the burner orifice, so that, the mixture being an explosive gaseous mixture, surface combustion thereof may take place as desired. A restriction which is adjustable for varying the richness of the mixture is desirably provided between the gas nozzle and the gas pressure governor.

With the parts of the apparatus suitably formed and proportioned, and with the gas nozzle of suitable size in proportion to the Venturi throat according to the character of the fuel gas and suitably positioned with relation to the throat, an explosive mixture of the fuel gas and air in the desired proportions may be obtained, and such proportions maintained approximately constant under variations in the amount of mixture supplied resulting from variation of the amount of air supplied or the pressure under which the air reaches the entrance cone of the Venturi tube, so that in practice the amount of mixture of uniform proportions supplied may be varied simply by adjusting the control valve or adjustable restriction past which the air flows to the supply chamber from the fan or other source of supply of air under sufficient pressure.

In order to maintain the proportions of fuel gas and air in the mixture constant under variations in air flow and amount of mixture supplied, the flow of the fuel gas, of the air, and of the mixture is controlled by orifices having approximately constant coefficients of discharge, and there is no or substantially no dead flow resistance between the flow-controlling orifices; the Venturi tube has its entrance and discharge cones of such limited angles that the gas will hug the sides of the discharge cone and not jump away therefrom and set up eddy currents therein, and the pressure under which the fuel gas, that is, the induced gas, is supplied is maintained substantially equal to the furnace pressure, or pressure against which the mixture is discharged from the burner orifices. The area of discharge nozzle or burner orifice or orifices should bear a suitable relation to the area of the Venturi throat; that is, the aggregate area of the discharge orifices should be small enough so that a proper or necessary pressure may be built up in the mixture flowing through the discharge or pressure cone of the Venturi tube, while yet being large enough so that sufficient pressure reduction may take place in the Venturi throat to induce the desired proportionate flow of the gas.

The development of back pressure resulting from the heating of the mixture in the burner orifice or orifices if the walls of the orifices should become highly heated would, in the absence of some means for compensating for the increase in back pressure, cause a change in the proportions of gas and air in the mixture. To avoid such upsetting of proportions, the burner should be made so that its orifice will have an approximately constant pressure-capacity characteristic, and this may be secured by forming the burners or discharge nozzles so that the walls of the orifices shall be prevented from becoming excessively heated in operation.

The explosive gaseous mixture supplied to a surface combustion furnace should be a homogeneous mixture. It is found that when gas is admitted to an air stream in ordinary pipes there is little tendency to mix, especially if the quantities are large, and some means for mixing the gases has to be provided to produce a mixture suitable for surface combustion. If, however, such unmixed streams of air and fuel gas in contact with each other are passed through a Venturi tube they emerge in a well mixed homogeneous stream as the result of the flow conditions which are peculiar to the double cone of the Venturi tube and without substantial loss of pressure. It is also found that when the fuel gas is admitted as above described to the throat of a Venturi tube through which a stream of air is passing, that a similar mixing action takes place and no additional mixing means is required, a thoroughly well mixed homogeneous stream of the mixture being supplied even with the Venturi tube closely adjacent to the burner discharge orifice.

By the term "surface combustion" as used herein is meant the combustion of an explosive gaseous mixture which is supplied at a velocity in excess of the rate of propagation of inflammation through the mixture so as to prevent backflashing through the supply nozzle or orifice, the mixture being then caused to spread out with rapid increase of its stream cross-section and consequent reduction of its flow velocity, and combustion taking place in a zone or surface at which the flow velocity of the mixture is equal to its rate of propagation of inflammation. Such surface combustion is disclosed in U. S. patents of Charles E. Lucke, among which are No. 755,376, dated March 22, 1904, and No. 1,146,724, dated July 13, 1915.

A full understanding of the invention can best be given by a detailed description of an approved form of apparatus embodying apparatus features of the invention and adapted for carrying out the method, and of the operation thereof, and such a description will now be given in connection with the accompanying drawings showing such an apparatus, and in which:—

Figure 1 is a view of an apparatus made in accordance with the invention with the principal parts thereof shown in section;

Fig. 1ª is an elevation partly broken away of a pressure governor such as shown in Fig. 1, but provided with an opening for maintaining atmospheric pressure against one side of the diaphragm;

Fig. 2 is a sectional view of a part of the furnace and one of the burner tubes taken on line 2—2 of Fig. 1, but on a reduced scale;

Fig. 3 is an enlarged detail sectional view of a part of the Venturi tube and the gas nozzle;

Fig. 4 is a detail sectional view showing an alternative form of means for controlling the quality of the mixture; and Fig. 5 is a detail sectional view showing another form of means for controlling the quality of the mixture.

Referring to the drawings, and first to Figs. 1, 2 and 3, the air which is to serve as the driving or inducing gas is supplied under a suitable pressure from a source of supply such as an ordinary fan blower 10, as shown in Fig. 1, the air being supplied through a supply pipe or conduit 11 to a chamber 12, and an adjustable restriction or valve 13 being provided in the supply pipe 11 for controlling the supply of air to the chamber 12 and the pressure maintained therein. Extending from one side of the casing of the chamber 12 is a Venturi tube 15 the entrance cone of which opens into the chamber and from the end of the discharge cone of which a delivery pipe 16 leads to the burner nozzles or mixture discharge orifices. An annular baffling flange 17 is provided within the chamber 12 about the entrance to the Venturi tube to insure an even flow of the air from all sides into the entrance cone of the Venturi tube.

The fuel gas from any suitable source of supply is led through a supply pipe 20 to a pressure governor 21 which reduces its pressure to that of atmosphere or other pressure approximately equal to the internal furnace pressure, and from the governor the gas under the desired pressure passes through a pipe 22 to be discharged from an outlet orifice or gas nozzle 23 into the throat of the Venturi tube. The governor may be of any suitable construction. The form which I use, and which is shown in the drawings, is a simple diaphragm governor having a controlling diaphragm 24 which forms one side of a chamber 25 to which the gas is admitted past a valve 26 which is connected with the diaphragm through its pivoted supporting lever 27 to be controlled thereby in the usual way. The other side of the diaphragm is subjected to a fluid pressure which determines the pressure to be maintained within the chamber 25 and under which the gas is to be supplied. When the internal furnace pressure is atmospheric pressure, or substantially so, the desired controlling pressure against the outer side of the diaphragm may be secured by having the same simply open to the atmosphere as by having an inclosing and protecting casing as shown formed, as shown in Fig. 1ª, with a free opening 28 so that atmospheric pressure will be maintained within the chamber 29 provided by such casing. If, however, the furnace pressure is greater or less than atmosphere, then the desired controlling pressure against the governor diaphragm may be obtained in a simple manner by means of a tube 30 as shown in Fig. 1 leading from the furnace chamber to the opening 28. The casing inclosing the diaphragm on its outer side being then a tight casing, the diaphragm will be at all times subjected to a pressure equal to the furnace pressure whether the same be constant or varying. Such connecting tube may of course be employed when the furnace pressure is that of atmosphere, but is not then necessary. By such pressure governing means, the fuel gas will always be supplied to the connecting supply pipe 22 under a pressure maintained equal to the internal furnace pressure, that is, the pressure against which the explosive mixture is discharged from the burner nozzles or discharge orifices.

The Venturi tube 15 must be of suitable form and of suitable limited angles between the sides of its entrance and discharge cones in order that constant proportions of the constituent gases in the mixture may be maintained under variations in quantity of mixture delivered, and also in order that the energy of the driving gas may be efficiently employed to supply the mixture under the desired pressure.

The stream of air passing through the throat has a high velocity, and the stream will not hug or flow smoothly along the sides of the discharge cone 35 if the included angle between the sides is too great. Too great an angle between the sides will therefore result in the formation of side or eddy currents. This is objectionable since conversion of velocity back into pressure in the discharge cone requires regular reduction of the velocity without side or eddy currents in order to be efficiently done, that is, in order to develop the maximum rise in pressure consistent with or corresponding to the decrease in velocity. Furthermore, the presence of such eddy currents results in a variation in the position longitudinally of the tube of the point of minimum jet cross-section under variation in the rate of flow. Such change in location of the point of minimum jet cross-section would interfere with the maintenance of constant proportions of the constituent gases in the mixture since it would mean a corresponding change in location of the point of maximum velocity and minimum pressure, which is at the point of minimum jet cross-section and would, therefore, not remain in constant or fixed position at the minimum cross-section or throat of the tube. On the other hand, too small an angle would mean an excessive length of the cone and involve excessive friction losses. An angle of 10° between the sides has been found to work well under usual conditions of operation with the air supplied under a pressure of two or three pounds.

If the included angle of the entrance cone 36 is too large, the air stream leaving the entrance cone will not fill the throat and first part of the discharge cone, but will jump clear of the walls making a so-called contracted vein (vena contracta) and set up eddy currents, which, in addition to preventing full recovery of pressure equivalent to the loss in velocity, interfere with the proportionality element by causing under variations in quantity of air flowing a movement longitudinal of the tube of the point of maximum velocity and minimum pressure, the location of which is determined by the minimum jet cross-section rather than by the minimum cross-section or throat of the tube. Such movement of the point of maximum velocity and minimum pressure under variable rates of flow must be avoided and the location of this point must be maintained constant for all rates of flow within the normal range of the apparatus in order that constant proportions may be maintained. To secure this result, the angle between the sides of the entrance cone and the formation of the cone must be such that its coefficient of discharge will be constant within the working range of flow rates, and desirably practically 100%. It has been found in practice that an angle of approximately 46° between the sides works well, and such an angle is considered best with the air supplied at a pressure of 2 or 3 pounds and with the apparatus otherwise constructed as shown. A smaller angle might be used, but if the angle is too small the air supply will encounter excessive friction in reaching the throat, although it would otherwise arrive all right. A comparatively short entrance cone is sufficient and the entrance diameter is not important, provided, however, that the cone should be long enough to give the required direction to the entering stream of air. A length equal to one-half the diameter of the throat has been found to work well. The sides of the entrance cone should, of course, curve gradually to the throat.

The Venturi tube should, therefore, have its entrance and discharge cones of such limited angles that the air or other gas will hug the sides of the discharge cone and maintain the position of the point of minimum jet cross-section stationary at the throat of the tube, and that the desired rise in pressure will be developed, and the necessary change of velocity energy back into pressure energy will be effected without excessive friction losses. The flow through the tube will be controlled by the entrance cone and throat according to the flow law of orifices, change in the pressure maintained in the supply chamber 12 causing change in flow with pressure drop and velocity increase at the throat according to such orifice flow law, without interference by varying coefficients of flow or velocity of entrance or discharge.

The gas nozzle 23 being set to discharge into the throat of the Venturi, a flow of gas therefrom results by reason of the depressed pressure which exists in the Venturi throat, and also probably somewhat through the entraining effect of the air flowing past the end of the nozzle. The nozzle orifice should have an area of suitable size for passing the proportionate amount of fuel gas desired with reference to the amount of air flowing, and, most desirably, should, when the inducing gas is supplied to the Venturi throat and the induced gas to the nozzle, be set back from the point of minimum throat cross-section of the Venturi tube a distance, depending on its outlet area, so that the area between the nozzle outlet and the walls of the Venturi entrance cone is substantially the same as the area of the throat, or so that the velocity of the air and its depressed pressure as it passes the edge of the fuel gas nozzle is substantially the same as at the minimum throat diameter, thus making the flow conditions of gas from this gas nozzle into the region of depressed pressure in the entrance cone the same as would be the conditions of flow into the throat at its minimum diameter from a gas nozzle occupying no space; allowance being made, however, for the volume of the space occupied by the entering fuel gas in the center of the air stream, which can be corrected for by enlarging the throat by an amount equivalent to the area of the entering stream of fuel gas, or by moving the gas nozzle back from the minimum throat diameter not quite so far as corresponds to zero gas flow.

The gas nozzle is made of such form, and the connecting supply pipe 22 between the nozzle and the pressure governor is of such relatively large size, that the flow through the nozzle will be in accordance with the flow law of orifices, and this nozzle or flow controlling orifice should be of such shape or form as to have a co-efficient of discharge which is approximately constant within the working flow range, as in the case of the entrance cone of the Venturi tube, in order that, adjustment being once made for the desired proportionate amount of fuel gas to the air for a given flow rate, the proportions will not vary for other flow rates by reason of variance in coefficients, that is, the nozzle should have a suitably rounded and tapered entrance and the orifice beyond the tapered entrance should be straight, or slightly tapered and as short as will co-operate suitably with other parts of the structure. The nozzle should also have a sharp discharge edge so as not to interfere with the air flow and to avoid eddy currents at the outlet.

The position of the fuel gas nozzle with respect to the Venturi throat may be varied somewhat, and such variation in position will have the effect of, and may be depended upon for, changing the proportions of the constituent gases in the mixture, or the richness of the mixture, movement of the nozzle inward or toward the throat increasing the richness of the mixture, and movement outward giving a leaner mixture. To provide for such relative adjustment between the nozzle and Venturi tube, the nozzle may be adjustably mounted as shown in Fig. 1. But movement of the nozzle inward from the best or most efficient position means loss of efficiency of the apparatus, and I consider it most desirable, therefore, under some conditions to have the nozzle remain in a fixed position and to provide other means for adjusting for change in proportions. An adjustable mounting of the nozzle such as shown may be employed for setting the nozzle in the position in which it is to remain, but usually it is not necessary to provide any such adjusting means for this purpose.

As before stated, the nozzle orifice should have an area suitable in proportion to the Venturi throat for passing the desired proportionate amount of fuel gas, and the size of the nozzle will vary according to the character of the fuel gas to be used. It is therefore most desirably made readily detachable so that nozzles of various sizes may be used for adapting the apparatus for different fuel gases which require to be mixed with the different proportionate amounts of air to form an explosive mixture. Change in proportions for any given fuel gas may also of course be accomplished by such change of nozzles.

It is desirable, however, that means be provided for adjusting proportions within limits without necessitating change of nozzles, and so that such adjustment may be made conveniently and while the apparatus is in operation. For this purpose, means for adjusting the nozzle 23 operable from outside the casing of the chamber 12 may be provided, and Fig. 4 shows such a means consisting of a rod 37 extending through the wall of the gas passage and a suitable stuffing box and carrying a hand wheel, whereby the threaded collar which carries the nozzle may be turned to cause it to move to adjust the nozzle longitudinally inward or outward with respect to the Venturi throat. Other means may also be provided for this purpose. For example, a nozzle may be used having an adjustable outlet area. Such a nozzle 23$^a$ is shown in Fig. 5, in which the outlet area of the nozzle is varied by adjusting the position of a flow-controlling wedge 40. Such a nozzle should of course be formed, as it may be in about the form shown, to have a coefficient of discharge which is constant, or approximately so, within the working range of flow. A way in which I now consider it best, however, under certain conditions, to provide for adjustment of proportions while the apparatus is in operation, and which I wish to claim in this application, is to provide an adjustable restriction formed to serve as a flow-controlling orifice of constant coefficient form placed in the connecting pipe between the gas nozzle and the governor. Such an adjustable flow controlling orifice or restriction is provided in the apparatus as shown in Figs. 1 and 4 by the valve 45 having its valve head and seat so formed as to provide an orifice having an approximately constant coefficient of discharge. When this valve is partly closed so that in the operation of the device, a drop in pressure will occur past the valve, the amount of gas passing through the nozzle 23 will of course be less than when the valve is wide open under which condition no such drop in pressure takes place. By adjustment of the valve, therefore, the proportions of the constituent gases in the mixture delivered from the Venturi tube may be varied as desired, and this is accomplished without interfering with the maintenance of proportionality under different rates of mixture supply since all the flow controlling orifices have the same flow law and the same or constant coefficients. It is sometimes desirable to provide both the adjustable restriction in the gas supply passage and the nozzle adjusting means.

The furnace, partly shown in Fig. 1, and a broken section of which is shown in Fig. 2, is an impact-jet, surface combustion furnace for burning explosive gaseous mixtures in accordance with the method of U. S. Patent No. 1,146,724, granted July 13, 1915, on an application of Charles E. Lucke. The furnace 50 comprises a structure providing a furnace chamber 51 in which is located one or more porous and permeable combustion supporting beds 52 of suitable refractory material against which jets of the explosive gaseous mixture are directed from nozzles 53 which are set in the furnace wall and which are supplied with the explosive mixture through connections from the delivery pipe 16 leading from the Venturi tube of the mixing apparatus. The jets of the explosive gaseous mixture, moving with a velocity in excess of the rate of propagation of inflammation of the mixture, strike against the combustion supporting beds by which the mixture is deflected and caused to spread out with rapid loss of flow velocity, and combustion of the mixture takes place at the surface of or within the bed as described in said patent.

The burner nozzles 53, like the gas and air controlling orifices, have discharge orifices of constant coefficient form, and the connecting passages between such orifices and the Venturi tube, including the delivery pipe 16, its branches, and the nozzles passages leading to their discharge orifices, are all of such relatively large size that there will be no or substantially no pipe resistance to affect the flow of the mixture. The connecting pipe 22 between the gas nozzle 23 and the gas chamber 25 of the governor being also of such relatively large size as to avoid pipe resistance, the flow of the air and of the fuel gas and of the mixture will, therefore, all be controlled only by orifices formed as described, and whatever pressure drop occurs in the apparatus must be through an orifice with velocity and pressure change according to the typical flow law of orifices, and not by reason of pipe, bend or eddy current losses.

If, however, the burner nozzles should in the operation of the furnace become so highly heated as to increase the back pressure by reason of heating of the mixture as it flows through the nozzles, this would, in the absence of means for compensating therefor, have the effect of changing the proportions of the mixture. Such increase in back pressure by increasing the pressure in the expansion cone of the Venturi tube would result in a reduction in the flow velocity through the Venturi throat and a reduction in the proportionate amount of fuel gas entering the throat from the nozzle 23. Such heating of the mixture in the burner nozzles is also bad in that it reduces the amount of mixture flowing from the nozzle under the available pressure. It is desirable, therefore, to employ nozzles formed to prevent such heating of the mixture, that is, to use nozzles having an approximately constant pressure-capacity characteristic under varying furnace temperatures, i. e., nozzles the capacity of or volume of flow through which under any given pressure is the same for different furnace temperatures to which the nozzle is exposed, or which have a constant flow coefficient regardless of furnace temperatures, and to avoid the use of nozzles having varying pressure-capacity characteristics, unless other means are provided for overcoming the effect of such nozzles on the maintenance of proportionality.

The desired constant pressure-capacity characteristic of the nozzles may be secured by forming the nozzles so that the temperature of the walls of their mixture passages will be prevented from becoming excessively high. For this purpose the nozzle should be so formed and mounted as to limit the amount of heat of combustion which will be taken up by the nozzle and to cause such heat as is taken up by the nozzle to be rapidly conveyed away so as to prevent any portion of the walls of the mixture passage of the nozzle from becoming unduly heated. This result is accomplished in the nozzles of the furnace shown in the drawings by having the nozzles formed and set in the furnace wall so that only a small portion of the end or nose of the nozzle is exposed to the furnace heat, the balance thereof being protected by the surrounding wall of material which is a poor heat conductor, and by forming the nozzle of a body of metal of sufficient continuous mass to rapidly conduct away to the outer portions of the nozzle body such heat as is absorbed by the exposed nose of the nozzle, and by forming the outer end of the nozzle body with means for discharging the heat, such as the heat dissipating fins or plates 54, for taking away and discharging the heat to the atmosphere. It is desirable that a limited annular portion of the metal about the discharge orifice of the nozzle be exposed to the interior of the furnace in order that no part of the relatively non-conducting material forming the furnace lining shall be in immediate contact with the gas stream issuing from the nozzle, since this material because of its poor heat conducting qualities becomes in operation of the furnace heated to incandescence, and if extended over the end of the nozzle so as to be in contact with the stream of mixture would cause ignition of some of the mixture at this point with resulting creeping back of ignition more or less within the nozzle passage and consequent heating of the mixture within the passage. With a nozzle formed and set as described and as shown in Fig. 2 of the drawings, excessive rise in temperature of the walls of the nozzle passage such as would substantially affect the maintenance of proportionality in the mixture may be effectually avoided. The prevention of the walls of the mixture discharge nozzle becoming unduly heated is also of importance in avoiding back flashing of an explosive mixture which would occur if the walls of the larger portion of the passage where the mixture moves more slowly should become heated to the ignition temperature.

In U. S. Letters Patent No. 1,242,114, dated October 2, 1917, Richardson, Eddison and Read, there is disclosed and claimed means such as described above for discharging the stream of mixture to be burned. In this application no claim is made to such means *per se*, but only as a part of apparatus for supplying a mixture of gases in approximately constant proportions.

The total area of the discharge orifices of the burner nozzles supplied with mixture from the mixing apparatus should bear a suitable relation to the capacity of the apparatus, and especially to the cross area of the Venturi throat. Too great an aggregate area of the burner discharge orifices would prevent the building up of the necessary mixture pressure for causing the required excess velocity of discharge from the nozzles, and too small an aggregate area of the discharge orifices would prevent sufficient pressure reduction at the Venturi throat. I have found it desirable in working with an air pressure of two or three pounds that the aggregate area of the burner discharge orifices should not be more than about twice the cross area of the Venturi throat. It should also be noted that any change in the aggregate area of the burner discharge orifices, such as a change in the number of burner nozzles supplied, will of course have a corresponding effect on the proportionality of the mixture.

In the operation of the apparatus, the air being supplied under suitable pressure and the apparatus being adjusted to secure the desired proportions for any flow rate, then the amount of mixture supplied may be varied as desired within the working limits of the apparatus by simply adjusting the air valve 13, the proportions of the mixture being maintained substantially constant. With opening and closing of the air valve, permitting more or less air to flow, the gas flow increases and decreases in the same proportions, and the final delivery pressure to the burner orifices rises and falls correspondingly, and all the desired conditions are fulfilled. The mixture supplied will be a well mixed, homogeneous mixture, as before pointed out.

While the invention has been illustrated as embodied in an apparatus in which the induced gas is supplied in a jet entering an annular stream of inducing gas, and this is usually the most desirable arrangement, obviously, the arrangement might be reversed, the driving gas being supplied to the central nozzle and the induced gas to the surrounding annular passage. Also, as before stated, it may sometimes be desirable to use the fuel gas as the driving or inducing gas when it is available under sufficient pressure. In any such case, the apparatus will, of course, be proportioned and adjusted accordingly, as will be clearly understood from the foregoing description.

The term "orifice" as used in the claims is to be understood to mean an opening which is restricted as compared to the adjacent flow passage or space and so formed as to control the flow of gas therethrough according to the typical flow law of orifices $(V = C\sqrt{2gh})$, true when the pressure or head $h$ is not too large, and an orifice having a constant coefficient or a constant coefficient orifice is to be understood as an orifice the coefficient of discharge of which is approximately constant within the normal working range of the apparatus or for which the area of the contracted vein of the jet is itself constant. It has been pointed out that the coefficients of the several flow-controlling orifices of the apparatus should each be approximately constant within the working range of the apparatus, and it is desirable for reasons which will be clear, that the coefficient of each such orifice should be approximately 100%.

What is claimed is:

1. The method of producing and supplying a mixture of gases in approximately constant proportions, which comprises supplying one of the gases under a higher pressure than the other to serve as an inducing gas, changing some of the pressure energy of such inducing gas to velocity energy with reduction of pressure, supplying the other gas through an outlet orifice to the stream of the inducing gas at a point of relatively high velocity and low pressure, changing some of the velocity energy of the mixture back to pressure energy, discharging the mixture through a discharge orifice and maintaining the supply pressure of the induced gas approximately equal to the pressure against which the mixture is discharged from the discharge orifice.

2. The method of producing and supplying a mixture of gases in approximately constant proportions, which comprises supplying one of the gases under a higher pressure than the other to serve as an inducing gas, changing some of the pressure energy of such inducing gas to velocity energy with reduction of pressure, supplying the other gas, under a pressure approximately equal to the pressure against which the mixture is discharged, to the stream of the inducing gas at a point of relatively high velocity and low pressure, changing some of the velocity energy of the mixture back to pressure energy, controlling the flow of the induced gas and the mixture according to the flow law of orifices having constant coefficients, and varying the quantity of mixture supplied by varying the supply of the inducing gas.

3. The method of producing and supplying a mixture of gases in approximately constant proportions, which comprises supplying one of the gases under a higher pressure than the other to serve as an inducing gas, changing some of the pressure energy of such inducing gas to velocity energy with reduction of pressure, supplying the other gas through an outlet orifice to the stream of the inducing gas at a point of relatively high velocity and low pressure, changing some of the velocity energy of the mixture back to pressure energy, discharging the mixture through a discharge orifice, maintaining the supply pressure of the induced gas approximately equal to the pressure against which the mixture is discharged from the discharge orifice, varying the quantity of mixture supplied by varying the supply of the inducing gas, and varying the proportions of the inducing and induced gases in the mixture by adjusting a flow controlling orifice in the passage through which the induced gas flows to said outlet orifice.

4. The method of supplying an explosive mixture of fuel gas and combustion supporting gas in approximately constant proportions to a surface combustion furnace, which comprises supplying one of the gases under a higher pressure than the other to serve as an inducing gas, changing some of the pressure energy of the inducing gas to velocity energy with reduction of pressure, supplying the other gas, under a supply pressure approximately equal to the internal furnace pressure, to the stream of the inducing gas at a point of relatively high velocity and low pressure, changing some of the velocity energy of the mixture back to pressure energy, and controlling the flow of the induced gas and the inducing gas and the mixture according to the flow law of orifices having constant coefficients.

5. The method of supplying an explosive mixture of fuel gas and combustion supporting gas in approximately constant proportions to a surface combustion furnace, which comprises supplying one of the gases to the entrance cone of a Venturi tube formed to maintain the point of minimum jet cross-section stationary under varying flow rates, supplying the other gas through a constant coefficient orifice discharging into the entrance cone of the Venturi tube in the direction of flow through the tube, one of said gases being supplied under pressure to serve as an inducing gas and the other being supplied under a pressure approximately equal to the internal furnace pressure, and controlling the flow of the mixture from the Venturi tube into the furnace according to the flow law of orifices having constant coefficients.

6. The method of supplying an explosive mixture of fuel gas and combustion supporting gas in approximately constant proportions to a surface combustion furnace, which comprises supplying one of the gases to the entrance cone of a Venturi tube formed to maintain the point of minimum jet cross-section stationary under varying flow rates, supplying the other gas through a constant coefficient orifice discharging into the entrance cone of the Venturi tube in the direction of flow through the tube, one of said gases being supplied under pressure to serve as an inducing gas and the other being supplied under a pressure approximately equal to the internal furnace pressure, and controlling the flow of the mixture from the Venturi tube into the furnace according to the flow law of orifices having constant coefficients by means of a discharge passage having an approximately constant pressure-capacity characteristic under varying furnace temperatures.

7. The method of producing and supplying a mixture of gases in approximately constant proportions, which comprises supplying one of the gases to the entrance cone of a Venturi tube having its entrance cone, throat and discharge cone formed to avoid eddy currents in the gases flowing therethrough, supplying the other gas through a constant coefficient orifice discharging into the entrance cone of the Venturi tube in the direction of flow through the tube, the gas supplied to the entrance cone of the Venturi tube being supplied under pressure to serve as an inducing gas and the other gas being supplied under a pressure approximately equal to the pressure against which the mixture is discharged, discharging the mixture from and controlling its flow by a constant coefficient orifice, and varying the quantity of mixture discharged by varying the amount of the inducing gas supplied.

8. The method of supplying an explosive mixture of fuel gas and combustion supporting gas in approximately constant proportions to a surface combustion furnace, which comprises forming the mixture by supplying one of the gases under a higher pressure than the other to serve as an inducing gas, changing some of the pressure energy of the inducing gas to velocity energy with reduction of pressure, inducing a flow of the other gas to mix with the high velocity stream of inducing gas, and changing some of the velocity energy of the mixture back to pressure energy, and supplying the mixture as formed to, controlling its flow by, and discharging it into the furnace through, a constant coefficient orifice having an approximately constant pressure-capacity characteristic under varying furnace temperatures.

9. The method of supplying a mixture of fuel gas and combustion supporting gas in approximately constant proportions to a furnace, which comprises forming a mixture with the aid of inducing action of one of the gases supplied under a relatively high pressure on the other gas supplied under a relatively low pressure, and supplying the mixture as formed to, controlling its flow by, and discharging it into the furnace through, a discharge passage having an approximately constant pressure capacity characteristic under varying furnace temperatures.

10. The method of supplying an explosive mixture of fuel gas and combustion supporting gas in approximately constant proportions to a surface combustion furnace, which comprises supplying the combustion supporting gas under a higher pressure than the fuel gas to serve as an inducing gas, changing some of the pressure energy of the inducing gas to velocity energy with reduction of pressure, supplying the fuel gas through a constant coefficient orifice to the stream of the combustion supporting inducing gas at a point of relatively high velocity and low pressure, changing some of the velocity energy of the mixture back to pressure energy, controlling the flow of the mixture according to the flow law of orifices having constant coefficients, and maintaining the supply pressure of the fuel gas approximately equal to the internal furnace pressure.

11. The method of supplying an explosive gaseous mixture of fuel gas and combustion supporting gas in approximately constant proportions to a surface combustion furnace having an internal pressure other than atmospheric, which comprises supplying one of the gases under a higher pressure than the other to serve as an inducing gas, changing some of the pressure energy of the inducing gas to velocity energy with reduction of pressure, supplying the other gas through a constant coefficient orifice under a supply pressure approximately equal to the internal furnace pressure to the stream of the inducing gas at a point of relatively high velocity and low pressure, changing some of the velocity energy of the mixture back to pressure energy, and controlling the flow of the mixture according to the flow law of orifices having constant coefficients.

12. Apparatus for producing and supplying a mixture of gases in approximately constant proportions, comprising in combination means for supplying one of the gases under a higher pressure than the other to serve as an inducing gas, flow controlling means adapted to change some of the pressure energy of such inducing gas to velocity energy with reduction of pressure, means providing an outlet orifice set to discharge into the stream of inducing gas at a point of relatively high velocity and low pressure and in the direction of flow thereof, means for supplying the other gas to said outlet orifice under a pressure approximately equal to the pressure against which the mixture is discharged, and means for changing some of the velocity energy of the mixture back to pressure energy.

13. Apparatus for producing and supplying a mixture of gases in approximately constant proportions, comprising in combination means for supplying one of the gases under a higher pressure than the other to serve as an inducing gas, flow controlling means adapted to change some of the pressure energy of such inducing gas to velocity energy with reduction of pressure, means providing an outlet orifice set to discharge into the stream of inducing gas at a point of relatively high velocity and low pressure and in the direction of flow thereof, means for supplying the other gas to said outlet orifice under a pressure approximately equal to the pressure against which the mixture is discharged, means for changing some of the velocity energy of the mixture back to pressure energy, and means for controlling the flow of the mixture according to the flow law of orifices having constant coefficients.

14. Apparatus for producing and supplying a mixture of gases in approximately constant proportions, comprising in combination means for supplying one of the gases under a higher pressure than the other to serve as an inducing gas, flow controlling means adapted to change some of the pressure energy of such inducing gas to velocity energy with reduction of pressure, means providing an outlet orifice set to discharge into the stream of inducing gas at a point of relatively high velocity and low pressure and in the direction of flow thereof, means for supplying the other gas to said outlet orifice under a pressure approximately equal to the pressure against which the mixture is discharged, means for changing some of the velocity energy of the mixture back to pressure energy, means for controlling the flow of the mixture according to the flow law of orifices having constant coefficients, and means for varying the supply of the inducing gas to vary the quantity of mixture supplied.

15. Apparatus for producing and supplying a mixture of gases in approximately constant proportions, comprising in combination a Venturi tube formed to maintain the point of minimum jet cross-section stationary under varying flow rates, means providing an outlet orifice set to discharge into the entrance cone of the Venturi tube in the direction of flow through the tube, connections for supplying gases to be mixed to the entrance cone of the Venturi tube and to said orifice respectively, means for supplying one of said gases under pressure to serve as the driving gas, means providing a constant coefficient flow-controlling orifice for controlling the flow of the gaseous mixture produced, means for supplying the other of said gases under a pressure approximately equal to the pressure against which the mixture is discharged from said last mentioned orifice, and means for varying the supply of the driving gas to vary the quantity of mixture supplied.

16. Apparatus for producing and supplying a mixture of gases in approximately constant proportions, comprising in combination a Venturi tube formed to maintain the point of minimum jet cross-section stationary under varying flow rates, means providing an outlet orifice set to discharge into the entrance cone of the Venturi tube in the direction of flow through the tube, connections for supplying gases to be mixed to the entrance cone of the Venturi tube and to said orifice respectively, means for supplying one of said gases under pressure to serve as the driving gas, means for controlling the pressure under which the other gas is supplied, and means providing a flow controlling orifice for controlling the flow of the gaseous mixture produced.

17. Apparatus for producing and supplying a mixture of gases in approximately constant proportions, comprising in combination a Venturi tube formed to maintain the point of minimum jet cross-section stationary under varying flow rates, means providing a constant coefficient outlet orifice set to discharge into the entrance cone of the Venturi tube in the direction of flow through the tube, means for supplying one of the gases to be mixed to the entrance cone of the Venturi tube under pressure, means for supplying another gas to said orifice, means providing a constant coefficient orifice through which the mixture received from the Venturi tube is discharged, and means for maintaining the initial pressure of said last mentioned gas approximately equal to the pressure against which the mixture is discharged from said last mentioned orifice.

18. An apparatus for producing and supplying a mixture of gases in approximately constant proportions, comprising in combination a Venturi tube having its entrance cone and discharge cone of limited angles, a nozzle set to discharge into the entrance cone of the Venturi tube in the direction of flow through the tube, means for supplying one of the gases under pressure to the entrance cone of the Venturi tube to serve as the inducing gas, means for supplying another gas to said nozzle under a pressure approximately equal to that against which the mixture is discharged, and means for controlling the flow of the mixture; the entrance cone of the Venturi tube and said nozzle and said means for controlling the flow of the mixture being all formed to control the flow of the gas according to the flow law of orifices having constant coefficients, and the connections between said parts of the apparatus being formed and proportioned to substantially avoid pipe, bend and eddy losses.

19. An apparatus for producing and supplying a mixture of gases in approximately constant proportions, comprising in combination a Venturi tube having its entrance cone and discharge cone of limited angles, a nozzle set to discharge into the entrance cone of the Venturi tube in the direction of flow through the tube, means for supplying one of the gases under pressure to the entrance cone of the Venturi tube to serve as the inducing gas, means for supplying another gas to said nozzle under a pressure approximately equal to that against which the mixture is discharged, and means for controlling the flow of the mixture; the entrance cone of the Venturi tube and said nozzle and said means for controlling the flow of the mixture being all formed to control the flow of the gas according to the flow law of orifices having constant coefficients, and the connections between said parts of the apparatus being formed and proportioned to substantially avoid pipe, bend and eddy losses; and adjusting means for varying the supply of the inducing gas to vary the quantity of mixture supplied.

20. Apparatus for producing and burning a mixture of fuel gas and combustion supporting gas in approximately constant proportions, comprising in combination a Venturi tube having its entrance cone and discharge cone of limited angles, a gas nozzle set to discharge into the entrance cone of the Venturi tube in the direction of flow through the tube, means for supplying one of the gases under pressure to the entrance cone of the Venturi tube to serve as the inducing gas, means for supplying the other gas to said nozzle under a pressure approximately equal to that against which the mixture is discharged, and a burner nozzle through which the mixture is discharged to be burned; the entrance cone of the Venturi tube and said gas nozzle and said burner nozzle being all formed to control the flow through them according to the flow law of orifices having constant coefficients, and the connections between said parts of the apparatus being formed and proportioned to substantially avoid pipe, bend and eddy losses, and the burner nozzle having an approximately constant pressure-capacity characteristic under varying temperatures to which it is exposed.

21. Apparatus for producing and burning a mixture of fuel gas and combustion supporting gas in approximately constant proportions, comprising a Venturi tube formed to maintain the point of minimum jet cross-section stationary under varying flow rates, means providing an outlet orifice set to discharge into the entrance cone of the Venturi tube in the direction of flow through the tube, connections for supplying the gases to be mixed to the entrance cone of the Venturi tube and to said orifice respectively, and a burner tube to which the mixture flows as it is produced, said burner tube having a flow-controlling discharge orifice of constant coefficient and which has an approximately constant pressure-capacity characteristic under varying temperatures to which it is exposed.

22. The combination with apparatus for producing and supplying an explosive mixture of fuel gas and combustion supporting gas in approximately constant proportions of which one of the gases in the operation of which one of the gases supplied under a greater pressure than the other exerts a flow inducing action on the other gas, of a burner to which the mixture flows as it is produced having a discharge orifice of constant coefficient and of approximately constant pressure-capacity characteristic.

23. The combination with apparatus for producing and supplying an explosive mixture of fuel gas and combustion supporting gas in approximately constant proportions, of a burner to which the mixture flows as it is produced having a discharge orifice of constant coefficient and approximately constant pressure-capacity characteristic.

24. The combination with apparatus for producing and supplying an explosive mixture of fuel gas and combustion supporting gas in approximately constant proportions, of a burner to which the mixture flows as it is produced having a discharge passage of approximately constant pressure-capacity characteristic.

25. Apparatus for producing and supplying a mixture of gases in approximately constant proportions, comprising in combination a Venturi tube formed to maintain the point of minimum jet cross-section stationary under varying flow rates; a nozzle having a constant coefficient orifice set to discharge into the entrance cone of the Venturi tube in the direction of flow through the tube, connections for supplying the gases to be mixed to the entrance cone of the Venturi tube and to said nozzle respectively, means providing a flow-controlling constant coefficient orifice for controlling the flow of the gaseous mixture produced, and adjustable controlling means for varying the pressure under which the driving gas is supplied to vary the amount of mixture produced without changing the proportions of the constituent gases therein.

26. Apparatus for producing and supplying a mixture of gases in approximately constant proportions, comprising in combination a Venturi tube formed to maintain the point of minimum jet cross-section stationary under varying flow rates, a nozzle having a constant coefficient orifice set to discharge into the entrance cone of the Venturi tube in the direction of flow through the tube, connections for supplying the gases to be mixed to the entrance cone of the Venturi tube and to said nozzle respectively, means providing a flow-controlling constant coefficient orifice for controlling the flow of the gaseous mixture produced, adjustable controlling means for varying the pressure under which the driving gas is supplied to vary the amount of mixture produced without changing the proportions of the constituent gases therein, and means adjustable for varying the proportionate amount of gas flowing from said nozzle.

27. Apparatus for producing and supplying a mixture of gases in approximately constant proportions, comprising in combination a Venturi tube formed to maintain the point of minimum jet cross-section stationary under varying flow rates, a nozzle having a constant coefficient orifice set to discharge into the entrance cone of the Venturi tube in the direction of flow through the tube, means providing a flow-controlling orifice for controlling the flow of the gaseous mixture produced, means for supplying one of the gases to the entrance cone of the Venturi tube under a higher pressure than the other gas to serve as the driving gas, means for supplying the other gas to said nozzle, pressure controlling means for maintaining the supply pressure of such other gas approximately equal to the pressure against which the mixture is discharged, and an adjustable restriction between said pressure controlling means and said nozzle for varying the proportionate amount of gas flowing from the nozzle.

28. Apparatus for producing and supplying a mixture of gases in approximately constant proportions, comprising in combination a Venturi tube formed to maintain the point of minimum jet cross-section stationary under varying flow rates, a nozzle having a constant coefficient orifice set to discharge into the entrance cone of the Venturi tube in the direction of flow through the tube, means providing a flow-controlling constant coefficient orifice for controlling the flow of the gaseous mixture produced, means for supplying one of the gases to the entrance cone of the Venturi tube under a higher pressure than the other gas to serve as the driving gas, pressure controlling means for maintaining the supply pressure of the gas supplied to said nozzle approximately equal to the pressure against which the mixture is discharged, and means for causing a relative longitudinal adjustment between said nozzle and the Venturi tube for varying the proportionate amount of gas flowing from the nozzle.

29. Apparatus for producing and supplying a mixture of gases in approximately constant proportions, comprising in combination a Venturi tube formed to maintain the point of minimum jet cross-section stationary under varying flow rates, a nozzle having a constant coefficient orifice set to discharge into the entrance cone of the Venturi tube in the direction of flow through the tube, means providing a flow-controlling orifice for controlling the flow of the gaseous mixture produced, means for supplying one of the gases to the entrance cone of the Venturi tube under a higher pressure than the other gas to serve as the driving gas, means for supplying the other gas to said nozzle, pressure controlling means for maintaining the supply pressure of such other gas approximately equal to the pressure against which the mixture is discharged, and means for varying the proportionate amount of gas flowing from the nozzle comprising means for causing a relative longitudinal adjustment between the nozzle and the Venturi tube and an adjustable restriction between the nozzle and said pressure controlling means.

30. Apparatus for producing and supplying a mixture of gases in approximately constant proportions, comprising in combination a Venturi tube formed to maintain the point of minimum jet cross-section stationary under varying flow rates, a nozzle set to discharge into the entrance cone of the Venturi tube in the direction of flow through the tube, connections for supplying the gases to be mixed to the entrance cone of the Venturi tube and to said nozzle respectively, means for supplying one of said gases under pressure to serve as the driving gas, pressure controlling means for maintaining the supply of pressure of the other gas approximately equal to the pressure against which the mixture is discharged, means providing a flow-controlling orifice for controlling the flow of the gaseous mixture produced, adjustable controlling means for varying the pressure under which the driving gas is supplied to vary the amount of mixture produced without changing the proportions of the constituent gases therein, and means adjustable for varying the proportionate amount of the induced gas entering the mixture.

31. Apparatus for producing and burning a mixture of gases in approximately constant proportions, comprising in combination with a furnace, a Venturi tube formed to maintain the point of minimum jet cross-section stationary under varying flow rates, a nozzle having a constant coefficient orifice set to discharge into the entrance cone of the Venturi tube in the direction of flow through the tube, connections for supplying gases to be mixed to the entrance cone of the Venturi tube and to said nozzle respectively, means for supplying one of said gases under pressure to serve as the driving gas, means for controlling the flow of the mixture from the Venturi tube into the furnace according to the flow law of orifices having constant coefficients, and means controlled by the internal furnace pressure for maintaining the supply pressure of the gas supplied to said nozzle approximately equal to the internal furnace pressure.

In testimony whereof I have hereunto set my hand in the presence of two subscribing witnesses.

W. BARTON EDDISON.

Witnesses:
JOHN H. BARTLETT, Jr.,
RUDOLPH RIEGER.